United States Patent
Lu et al.

(10) Patent No.: US 9,805,155 B2
(45) Date of Patent: Oct. 31, 2017

(54) CIRCUIT LAYOUTS, METHODS AND APPARATUS FOR ARRANGING INTEGRATED CIRCUITS

(71) Applicant: MediaTek Inc., Hsin-Chu (TW)

(72) Inventors: Chien-Pang Lu, Zhubei (TW); Yu-Tung Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/008,902

(22) Filed: Jan. 28, 2016

(65) Prior Publication Data

US 2016/0292340 A1   Oct. 6, 2016

Related U.S. Application Data (60) Provisional application No. 62/140,576, filed on Mar. 31, 2015.

(51) Int. Cl.
*G06F 17/50* (2006.01)

(52) U.S. Cl.
CPC ...... *G06F 17/5072* (2013.01); *G06F 17/5077* (2013.01); *G06F 17/5081* (2013.01); *G06F 17/5059* (2013.01); *G06F 2217/84* (2013.01)

(58) Field of Classification Search
CPC ............ G06F 17/5072; G06F 17/5077; G06F 17/5081; G06F 17/5059; G06F 2217/84
See application file for complete search history.

(56) References Cited

U.S. PATENT DOCUMENTS

| | | | | | |
|---|---|---|---|---|---|
| 5,452,239 A | * | 9/1995 | Dai | ...................... | G06F 17/5027 703/19 |
| 7,424,693 B2 | * | 9/2008 | Alter | ................... | G06F 17/5031 716/106 |
| 7,610,571 B2 | * | 10/2009 | Chen | ................... | G06F 17/5022 716/109 |
| 7,653,884 B2 | * | 1/2010 | Furnish | ............... | G06F 17/5068 716/103 |
| 7,669,165 B2 | * | 2/2010 | Pandey | ............... | G06F 17/5045 716/109 |
| 7,921,401 B2 | * | 4/2011 | Ito | ....................... | G06F 17/5018 716/136 |
| 8,122,405 B2 | * | 2/2012 | Matsumoto | ......... | G06F 17/5031 716/100 |
| 8,839,173 B1 | * | 9/2014 | Jiang | ..................... | G06F 17/505 716/111 |

(Continued)

*Primary Examiner* — Naum B Levin
(74) *Attorney, Agent, or Firm* — McClure, Qualey & Rodack, LLP (57) ABSTRACT

A method for arranging an integrated circuit to correct a hold-time violation is provided. A first layout of the integrated circuit is prepared. The first layout includes a plurality of cells including a plurality of cell pins, wires connected between the cells, and one of the cell pins is located in a preservation area. The hold-time violation of the first layout is estimated to obtain an estimation result. A dummy wire structure is designed to be placed in the preservation area according to the estimation result to correct the hold-time violation. The dummy wire structure only contacts the cell pin in the preservation area. A second layout is generated according to the first layout and the designed dummy wire structure. The integrated circuit is arranged according to the second layout.

27 Claims, 7 Drawing Sheets

(56) References Cited

U.S. PATENT DOCUMENTS

| | | | |
|---|---|---|---|
| 2004/0250185 A1* | 12/2004 | Date | G01R 31/318536 714/726 |
| 2009/0193374 A1* | 7/2009 | Fujimoto | G06F 17/5031 716/113 |
| 2014/0258957 A1* | 9/2014 | Jiang | G06F 17/505 716/114 |

* cited by examiner

CIRCUIT LAYOUTS, METHODS AND APPARATUS FOR ARRANGING INTEGRATED CIRCUITS

CROSS REFERENCE TO RELATED APPLICATIONS

This application claims the benefit of U.S. Provisional Application No. 62/140,576 filed on Mar. 31, 2015, the entirety of which is incorporated by reference herein.

BACKGROUND OF THE INVENTION

Field of the Invention

The disclosure relates generally to circuit layouts and methods for arranging an integrated circuit, and more particularly it relates to circuit layouts and methods for arranging an integrated circuit to correct hold-time violations.

Description of the Related Art

A digital circuit design often includes a large number of sequential and combinatorial cells. A sequential cell is a circuit element that is triggered by a clock signal, e.g., a register or a latch. A combinatorial cell is a circuit element that is not triggered by a clock signal, e.g., an AND gate, an OR gate, some other type of gate, an inverter, and so on. A sequential cell typically has various timing requirements such as setup time and hold-time requirements. The setup time is the amount of time a signal is required to remain stable at a data input of the sequential cell before the arrival of a clock edge. The hold time is the amount of time the signal is required to remain stable at the sequential cell input after the arrival of the clock edge.

The combinatorial cells are typically dispersed among the synchronous cells in the circuit design. The combinatorial cells introduce delays on the signals sent between the sequential cells. If the delays through the combinatorial cells are too short, then the signals may violate hold-time requirements. Hold-time violations may also be caused by clock skew, or more generally clock edge alignment.

Many conventional circuit design tools are not able to effectively deal with hold-time violations. For example, these tools may only add a delay buffer between the cells of a signal path with hold-time violation. However, the insertion of a delay buffer between the cells of a signal path may cause the problems of power leakage, routing congestion, and routing and area penalties.

There is therefore a need in the art for techniques to fix hold-time violations in a circuit design.

BRIEF SUMMARY OF THE INVENTION

An embodiment of a method for arranging an integrated circuit to correct a hold-time violation is provided. A first layout of the integrated circuit is prepared. The first layout includes a plurality of cells including a plurality of cell pins, wires connected between the cells, and one of the cell pins is located in a preservation area. The hold-time violation of the first layout is estimated to obtain an estimation result. A dummy wire structure is designed to be placed in the preservation area according to the estimation result to correct the hold-time violation. The dummy wire structure only contacts the cell pin in the preservation area. A second layout is generated according to the first layout and the designed dummy wire structure. The integrated circuit is arranged according to the second layout.

A circuit layout of an integrated circuit is provided, includes a preservation area, a plurality of cells, a plurality of wires connected between the cells, and a dummy wire structure. The cells includes a plurality of cell pins, wherein one of the cells is located in the preservation area. The dummy wire structure is placed in the preservation area and contacted with the cell pin in the preservation area only.

An apparatus for arranging an integrated circuit to correct a hold-time violation is provided. The apparatus includes means for preparing a first layout of the integrated circuit, wherein the first layout comprises a plurality of cells including a plurality of cell pins, wires connected between the cells, and one of the cell pins is located in a preservation area; means for estimating the hold-time violation of the first layout to obtain an estimation result; means for designing a dummy wire structure to be placed in the preservation area according to the estimation result to correct the hold-time violation, wherein the dummy wire structure only contacts the cell pin in the preservation area; means for generating a second layout according to the first layout and the designed dummy wire structure; and means for arranging the integrated circuit according to the second layout.

A detailed description is given in the following embodiments with reference to the accompanying drawings.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the invention. Specific examples of components and arrangements are described below to simplify the present disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 1:
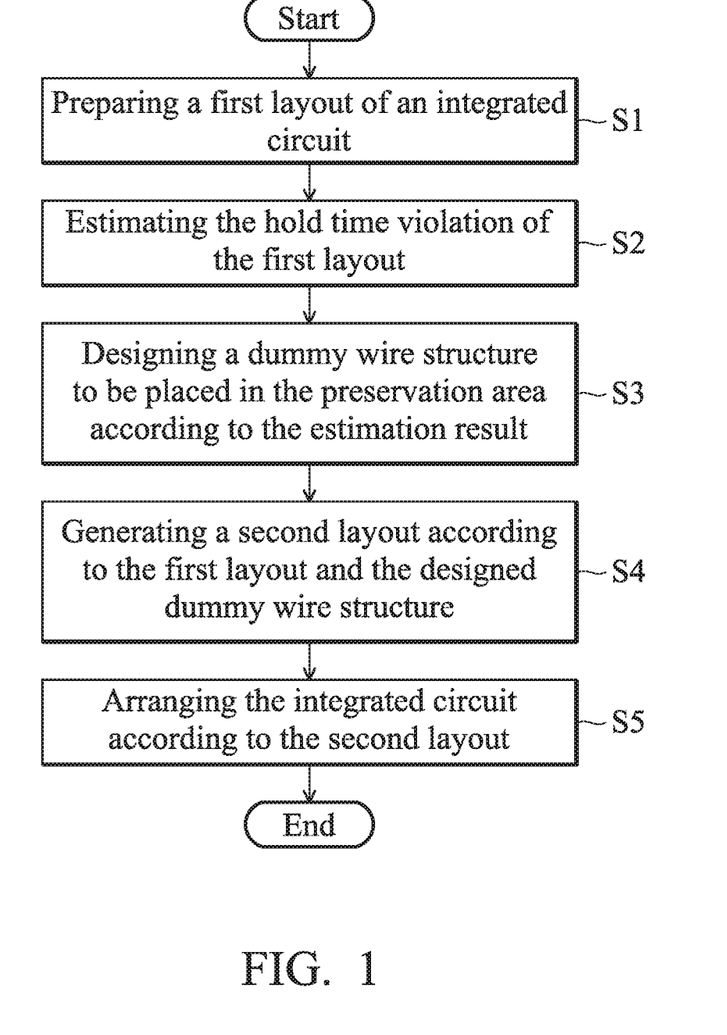
FIG. 1 illustrates a flowchart of the method for arranging an integrated circuit to correct a hold-time violation according to an embodiment of the disclosure.

FIG. 1 illustrates a flowchart of the method for arranging an integrated circuit to correct a hold-time violation according to an embodiment of the disclosure. It should be understood that additional operations may be performed before, during, and/or after the method depicted in FIG. 1, and that some other processes may only be briefly described herein.

First, a first layout of the integrated circuit is prepared (S1). The first layout is prepared according design descriptions and technology descriptions of the integrated circuit.

The design description may comprise design information of all or any portion of the integrated circuit and associated design specific data, for example, a gate-level netlist, placement constraints, and timing requirements etc. The gate-level netlist may be provided in any proprietary or standard format, or a hardware description language (such as Verilog). The technology descriptions may comprise information relating to fabrication material information and manufacturing information. The fabrication material information may include data describing wafers and any associated predetermined processing on the wafers (for example fabrication of lower layers of devices). The predetermined processing may be associated with transistors, combinatorial logic gates, sequential logic devices, storage arrays, regular structures, power distribution, clock distribution, routing elements, and other similar portions of active and passive circuitry. The manufacturing information may include information relating to physical and electrical design rules and parameters for extraction of parasitic information for analyzing results during physical design processing. In addition, in the first layout, the physical locations of some or all of the devices are also determined, i.e. the design is placed, and wiring according to the netlist is determined (i.e. the design is routed).

Figure 2:
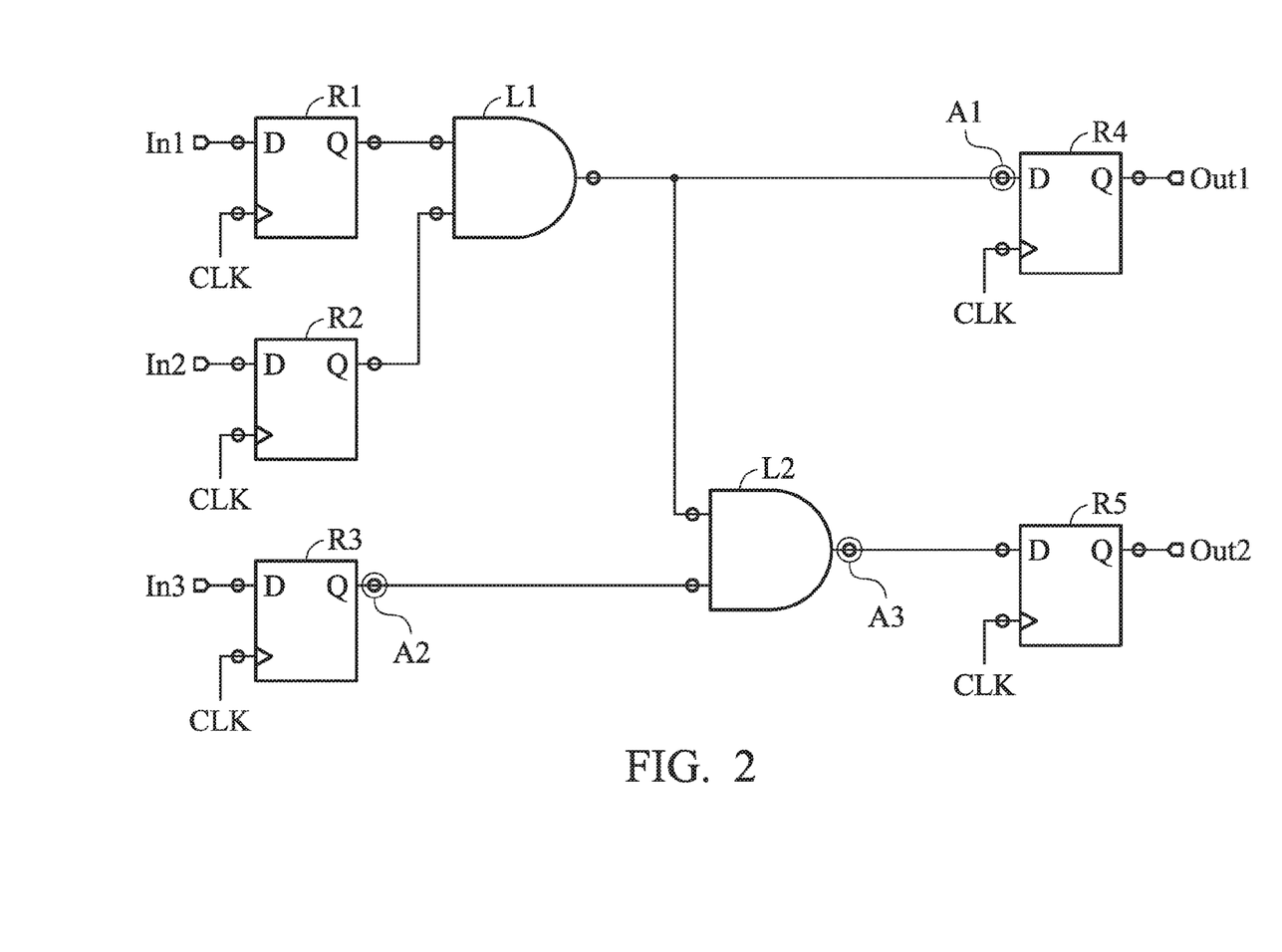
FIG. 2 shows an simple circuit diagram of a portion of the integrated circuit according to an embodiment of the disclosure.

FIG. 2 shows a simple circuit diagram of a portion of the integrated circuit according to an embodiment of the disclosure. As shown in FIG. 2, the circuit includes registers R1 through R5 and AND logic gates L1 and L2. Each register can be a D flip-flop having a data (D) input, a clock input, and a data (Q) output. The D inputs of the registers R1, R2 and R3 are coupled to the input ports In1, In2 and In3, respectively. The Q outputs of the registers R1 and R2 are coupled to the two inputs of AND logic gate L1. The Q output of the register R3 and the output of the AND logic gate L1 are coupled to the two inputs of the AND gate L2. The output of the AND logic gate L1 is also coupled to the D input of the registers R4. The output of the AND logic gate L2 is coupled to the D input of the registers R5. The Q outputs of registers R4 and R5 are coupled to the output ports Out1, and Out2, respectively.

The first layout corresponding to the circuit shown in FIG. 2 comprises a plurality of cells, such as the registers R1~R5 and the AND logic gates L1~L2, and wires connected between the cells. Each cell may include a plurality of cell pins to connect to the other cell through wires, for example, the D inputs and Q outputs of the registers, and the inputs and outputs of the AND gates. In an embodiment, some cell pins are selected to be located in a corresponding preservation areas A1~A3.

Figure 3:
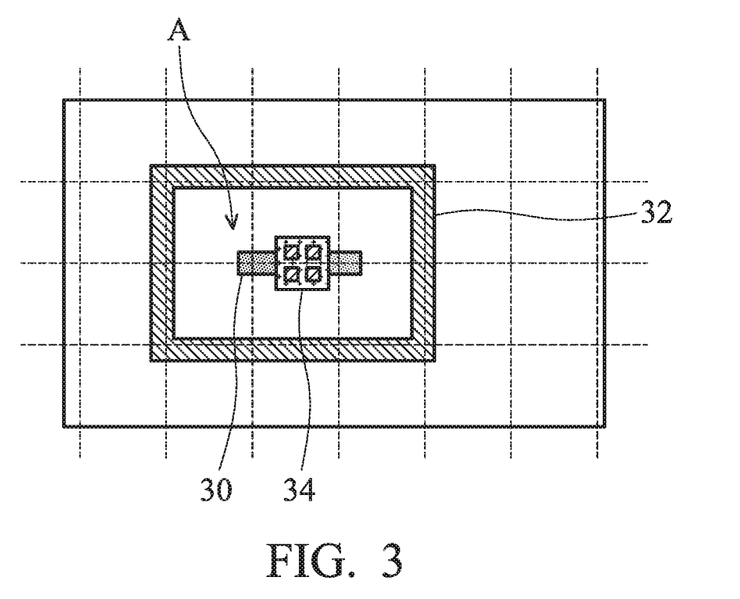
FIG. 3 shows the layout of the cell pin according to an embodiment of the disclosure.

FIG. 3 shows the layout of the cell pin according to an embodiment of the disclosure. As shown in FIG. 3, the selected cell pin 30 is located in a preservation area A. The preservation area A is surrounded by an obstacle structure 32. With the existence of the obstacle structure 32, the other cells and wires will not be placed in the preservation area A. In addition, since the selected cell pin 30 is blocked by the obstacle structure 32, the cell pin 30 is connected to another cell through a via structure 34. According to an embodiment of the disclosure, the preservation area A preserves a region for fixing the hold-time violation in the following processes. Note that the shape of the preservation area A shown in FIG. 3 is a rectangle, however, the preservation area A can be any other shape, depending on the design requirements.

Returning back to FIG. 1, in step S2, the placed and routed design is analyzed to estimate the hold-time violation of the first layout. Referring FIG. 2, using the hold-time violation occurred in the signal path of the register R1, the AND logic gate L1 and the register R4 as an example, a dummy wire structure is designed to be placed in the preservation area A1 according to the estimation result to correct the hold-time violation (S3).

FIGS. 4A~4F illustrate the examples of the dummy wire structure. In an embodiment of the disclosure, the hold-time violation is corrected according to the resistance of the dummy wire structure. Before placing the dummy wire structure, the whole obstacle structure 32 in the first layout should be removed, and the dummy wire structure is placed in the preservation area A. In an embodiment, the dummy wire structure can be placed along the profile of the preservation area A. Note that the dummy wire structure may comprise a plurality of terminals, and only one terminal contacts the cell pin in the preservation area, and the other terminals are physically separated from the other cells. Specifically, the dummy wire structure is not connected between the cell pins through its different terminals.

Figure 4A:
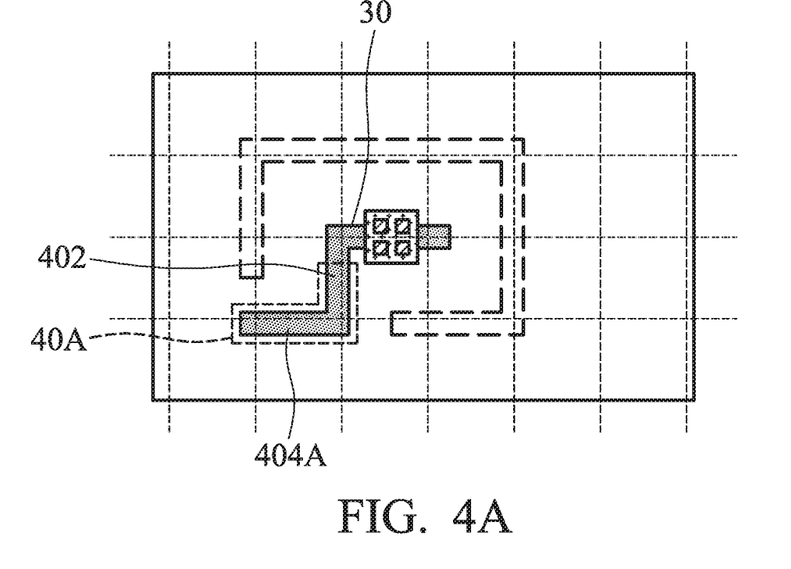
FIGS. 4A~4F illustrate the examples of the dummy wire structure according to the embodiments of the disclosure.

In FIG. 4A, the dummy wire structure 40A comprises a first section 402 and a second section 404A. The first section 402 extends in a first direction and comprises a first end connected to the cell pin 30, and a second end. The second section 404A extends in a second direction perpendicular to the first direction, and comprises a first end connected to the second end of the first section 402, and a second end. The total length of the first section 402 and the second section 404A may develop 1 p (second) delay in a corresponding signal path.

Figure 4B:
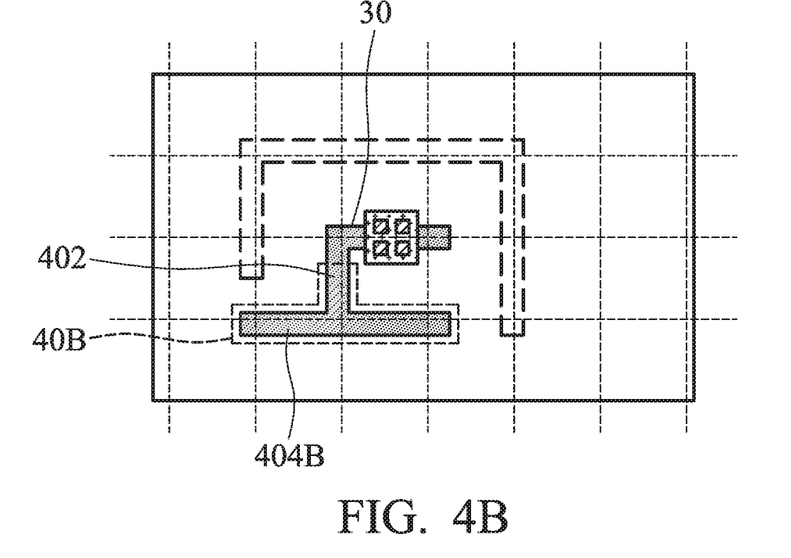

In FIG. 4B, the dummy wire structure 40B comprises a first section 402 and a second section 404B. The first section 402 extends in a first direction and comprises a first end connected to the cell pin 30, and a second end. The second section 404B extends in a second direction perpendicular to the first direction, and comprises a first end and a second end. The second end of the first section 402 is connected between the first end and the second end of the second section 404B. Since the second section 404B has a longer length than the second section 404A in FIG. 4A, the total length of the first section 402 and the second section 404B may develop 2 p (second) delay in a corresponding signal path.

Figure 4C:
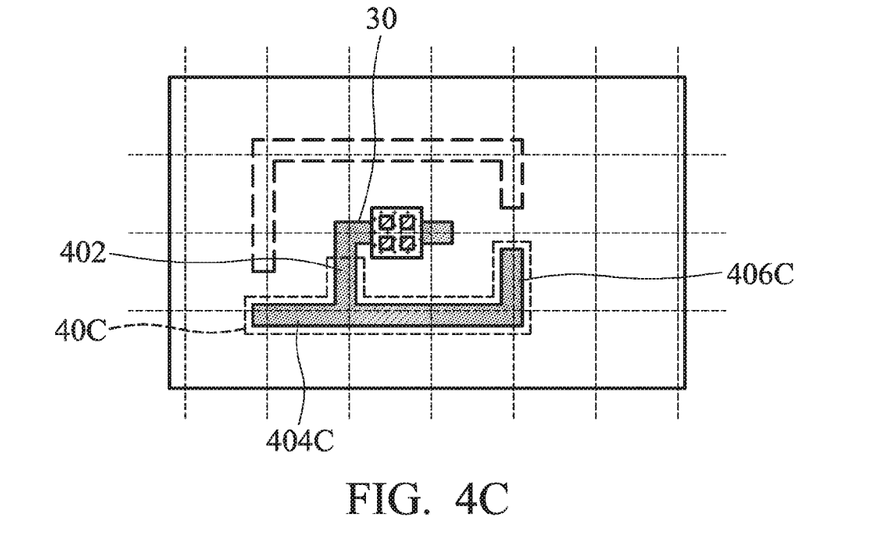

In FIG. 4C, the dummy wire structure 40C comprises a first section 402, a second section 404C and a third section 406C. The first section 402 extends in a first direction and comprises a first end connected to the cell pin 30, and a second end. The second section 404C extends in a second direction perpendicular to the first direction, and comprises a first end and a second end. The second end of the first section 402 is connected between the first end and the second end of the second section 404C. The third section 406C extends in the first direction, and comprises a first end connected to one of the first end and the second end of the second section 404C, and a second end. The total length of the first section 402, the second section 404C and the third section 406C may develop 3 p (second) delay in a corresponding signal path.

Figure 4D:
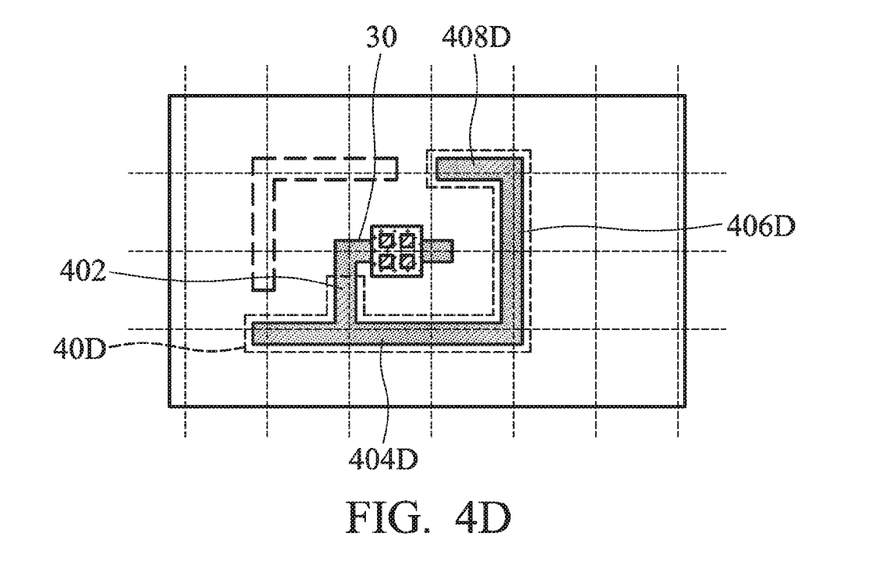

In FIG. 4D, the dummy wire structure 40D comprises a first section 402, a second section 404D, a third section 406D and a fourth section 408D. The first section 402 extends in a first direction and comprises a first end connected to the cell pin 30, and a second end. The second section 404D extends in a second direction perpendicular to the first direction, and comprises a first end and a second end. The second end of the first section 402 is connected between the first end and the second end of the second section 404D. The third section 406D extends in the first direction, and comprises a first end connected to one of the first end and the second end of the second section 404D, and a second end. The fourth section 408D extends in the second direction, and comprises a first end connected to the second end of the third section 406D, and a second end. The total length of the first section 402, the second section 404D, the third section 406D and the fourth section 408D may develop 4 p (second) delay in a corresponding signal path.

Figure 4E:
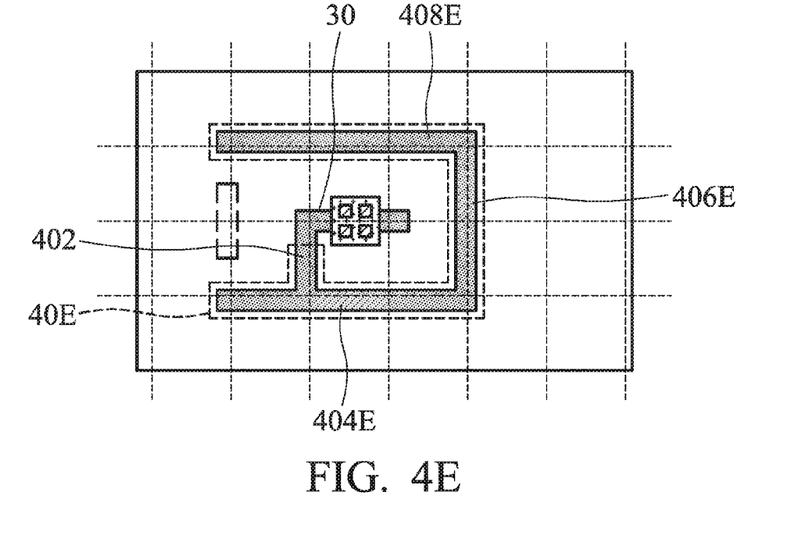

In FIG. 4E, the dummy wire structure 40E comprises a first section 402, a second section 404E, a third section 406E and a fourth section 408E. The first section 402 extends in a first direction and comprises a first end connected to the cell pin 30, and a second end. The second section 404E extends in a second direction perpendicular to the first direction, and comprises a first end and a second end. The second end of the first section 402 is connected between the first end and the second end of the second section 404E. The third section 406E extends in the first direction, and comprises a first end connected to one of the first end and the second end of the second section 404E, and a second end. The fourth section 408E extends in the second direction, and comprises a first end connected to the second end of the third section 406E, and a second end. Since the fourth section 408E has a longer length than the fourth section 408D in FIG. 4D, the total length of the first section 402, the second section 404E, the third section 406E and the fourth section 408E may develop 5 p (second) delay in a corresponding signal path.

Figure 4F:
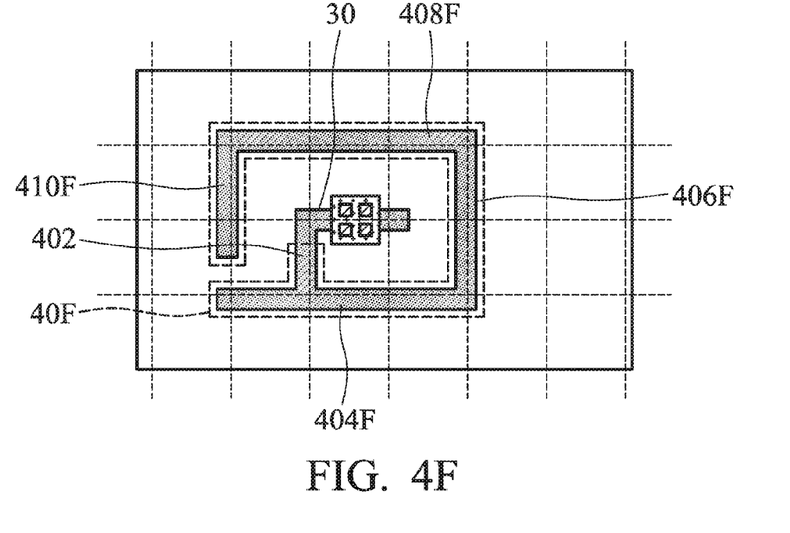

In FIG. 4F, the dummy wire structure 40F comprises a first section 402, a second section 404F, a third section 406F, a fourth section 408F and a fifth section 410F. The first section 402 extends in a first direction and comprises a first end connected to the cell pin 30, and a second end. The second section 404F extends in a second direction perpendicular to the first direction, and comprises a first end and a second end. The second end of the first section 402 is connected between the first end and the second end of the second section 404F. The third section 406F extends in the first direction, and comprises a first end connected to one of the first end and the second end of the second section 404F, and a second end. The fourth section 408F extends in the second direction, and comprises a first end connected to the second end of the third section 406F, and a second end. The fifth section 410F extends in the first direction, and comprises a first end connected to the second end of the fourth section 408F, and a second end. The total length of the first section 402, the second section 404F, the third section 406F, the fourth section 408F and the fifth section 410F develops 6 p (second) delay in a corresponding signal path.

Note that the dummy wire structures 40A~40F shown in FIGS. 4A~4F are merely examples and are not intended to be limiting. For example, the profile of the dummy wire structure 40 can be changed, those skilled in the art should realize to change the profile of the dummy wire structures to change the total length of the dummy wire structure, and to obtain the required delay according to the hold-time violation. In addition, the layouts of the dummy wire structures are not limited to being located along the profile of the obstacle structure 32, the sections of the dummy wire structure 40 can be placed in any regions of the preservation area, and even outside the preservation area if possible.

In addition, a lookup table may be generated according to the delay times corresponding to different resistances of the dummy wire structures. Thus, the selection of the dummy wire structures can be determined according to the lookup table to correct the hold-time violation. For example, referring FIG. 2, when the hold-time violation occurred in the signal path of the register R1, the AND logic gate L1 and the register R4 is 3 p seconds, the dummy wire structure 40C shown in FIG. 4C can be selected to be placed in the preservation area A1. In addition, the hold-time violation can be fixed using a plurality of preservation areas. For example, when the hold-time violation occurred in the signal path of the register R3, the AND logic gate L2 and the register R5 is 7 p seconds, the dummy wire structure 40B shown in FIG. 4B can be selected to be placed in the preservation area A2 and the dummy wire structure 40E shown in FIG. 4E can be selected to be placed in the preservation area A3 to provide total 7 p seconds delay for the signal path.

Returning back to FIG. 1, in step S4, a second layout is generated according to the first layout and the designed dummy wire structure. In the second layout, the obstacle structure in the first layout has been removed, and the designed dummy wire structure is placed in the corresponding preservation area. Next, the integrated circuit is arranged according to the second layout (S5). Since the processes for arranging the integrated circuit are wholly conventional and will be fully appreciated by those of ordinary skill in the art, the detailed operations are omitted here for sake of brevity.

Figure 5:
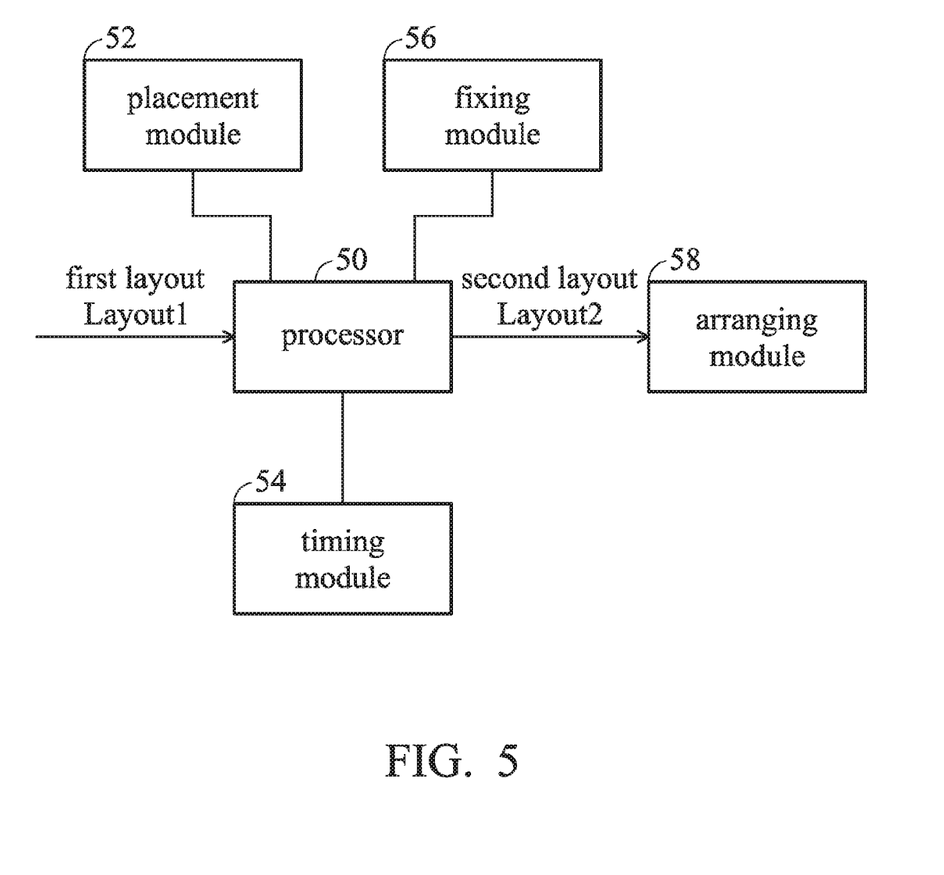
FIG. 5 is a system diagram for hold-time correction.

FIG. 5 is a system diagram for hold-time correction. The system for hold-time fixing comprises a processor 50 coupled to a memory storing instructions, and a display. The display may be any electronic display, including but not limited to, a computer display, a laptop screen, a tablet computer screen, a cell phone display, a mobile device display, a remote with a display, a television, a projector, or the like. The processor 50 may obtain a first layout Layout1, use a placement module 52 to allocate placement regions for the first layout Layout1, a timing module 54 to estimate the hold-time violation of the first layout Layout1, use a fixing module 56 to correct the hold-time violation on the first layout Layout1 by designing a dummy wire structure, and generate a second layout Layout2 according to the first layout Layout1 and the designed dummy wire structure. The arranging module 58 arranges an integrated circuit according to the second layout Layout2. The detailed operations of the fixing module 56 and the features of the dummy wire structure are disclosed previously and is omitted here for sake of brevity. In addition, since the processes for arranging the integrated circuit are wholly conventional and will be fully appreciated by those of ordinary skill in the art, the detailed operations are omitted here for sake of brevity.

The system according to an embodiment of the disclosure may include computer program product comprising: code for preparing a first layout of the integrated circuit, wherein the first layout comprises a plurality of cells including a plurality of cell pins, wires connected between the cells, and one of the cell pins is located in a preservation area; code for estimating the hold-time violation of the first layout to obtain an estimation result; code for designing a dummy wire structure to be placed in the preservation area according to the estimation result to correct the hold-time violation, wherein the dummy wire structure only contacts the cell pin in the preservation area; code for generating a second layout according to the first layout and the designed dummy wire structure; and code for arranging the integrated circuit according to the second layout.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions generally referred to herein as a "circuit," "module," or "system" may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It should be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the disclosure are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It should be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the disclosure may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Furthermore, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

According to the embodiments of the disclosure, some preservation areas are preserved for placing a dummy wire structure to correct the hold-time violation, and the dummy wire structure only contacts the cell pin in the preservation area, not connected between different cells, the routing congestion is thus reduced. In addition, the hold-time violation is fixed using the resistance of the dummy wire structure, which has a simple layout, comparing with using buffer elements, the power leakage and layout area is decreased.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for arranging an integrated circuit to correct a hold-time violation, comprising:
    preparing a first layout of the integrated circuit, using a processor, wherein the first layout comprises a plurality of cells including a plurality of cell pins, wires connected between the cells, and one of the cell pins is located in a preservation area, wherein the preservation area in the first layout is surrounded by an obstacle structure;
    estimating the hold-time violation of the first layout to obtain an estimation result;
    designing a dummy wire structure to be placed in a profile of the obstacle structure according to the estimation result to correct the hold-time violation, wherein the dummy wire structure only contacts the cell pin in the preservation area;
    generating a second layout according to the first layout and the designed dummy wire structure; and fabricating the integrated circuit according to the second layout,
wherein the obstacle structure obstructs the cells and wires being placed in the preservation area.

2. The method of claim 1, further comprising removing the obstacle structure from the first layout and placing the dummy wire structure in the preservation area when generating the second layout.

3. The method of claim 1, wherein the dummy wire structure comprises a plurality of sections, and the hold-time violation is corrected according to a total length of the sections.

4. The method of claim 1, wherein the dummy wire structure comprises a first section connected to the cell pin in the preservation area and a second section connected to the first section, and the second section extends along a partial profile of the obstacle structure for a predetermined length.

5. The method of claim 4, wherein the predetermined length is determined according to the hold-time violation.

6. The method of claim 1, wherein the dummy wire structure comprises a plurality of terminals, only one of the terminals is connected to the cell pin in the preservation area, and the other terminals are physically separated from the other cells.

7. The method of claim 1, wherein the cell pin in the preservation area is connected to another cell through a via structure.

8. The method of claim 1, wherein the hold-time violation is corrected according to a resistance of the dummy wire structure.

9. The method of claim 1, further comprising generating a lookup table according to developed delay times corresponding to different types of dummy wire structure, and the dummy wire structure is selected according to the lookup table.

10. A circuit of an integrated circuit, comprising:
a plurality of cells including a plurality of cell pins, wherein one of the cells is located in a preservation area;
a plurality of wires connected between the cells; and
a dummy wire structure placed in a profile of the preservation area and contacted with a single cell pin of the one of the cells in the preservation area only.

11. The circuit of claim 10, wherein the wires are precluded from the preservation area.

12. The circuit of claim 10, wherein the dummy wire structure comprises a plurality of sections, and a total length of the sections is determined according to a hold-time violation of the integrated circuit.

13. The circuit of claim 10, wherein the dummy wire structure comprises a first section connected to the cell pin in the preservation area and a second section connected to the first section, and the second section extends along a partial profile of the preservation area for a predetermined length.

14. The circuit of claim 13, wherein the predetermined length is determined according to a hold-time violation of the integrated circuit.

15. The circuit of claim 10, wherein the dummy wire structure comprises a plurality of terminals, only one of the terminals is connected to the cell pin in the preservation area, and the other terminals are physically separated from the other cells.

16. The circuit of claim 10, further comprising a via structure, wherein the cell pin in the preservation area is connected to another cell through a via structure.

17. The circuit of claim 10, wherein a resistance of the dummy wire structure is determined according to a hold-time violation of the integrated circuit.

18. The circuit of claim 10, wherein the dummy wire structure is determined according to a lookup table, the lookup table is generated according to developed delay times corresponding to different types of dummy wire structure, and the dummy wire structure is selected according to the lookup table.

19. A method for arranging an integrated circuit to correct a hold-time violation, comprising:
preparing a first layout of the integrated circuit, using a processor, wherein the first layout comprises a plurality of cells including a plurality of cell pins, wires connected between the cells, and one of the cell pins is located in a preservation area, wherein the preservation area in the first layout is surrounded by an obstacle structure;
estimating the hold-time violation of the first layout to obtain an estimation result;
selecting a dummy wire structure to be placed in a profile of the obstacle structure from different types of dummy wire structures each having an individual delay time according to the estimation result to correct the hold-time violation;
generating a second layout according to the first layout and the selected dummy wire structure, wherein the selected dummy wire structure only contacts the cell pin in the preservation area; and
fabricating the integrated circuit according to the second layout,
wherein the obstacle structure obstructs the cells and wires being placed in the preservation area.

20. The method of claim 19, further comprising means for removing the obstacle structure from the first layout and placing the dummy wire structure in the preservation area when generating the second layout.

21. The method of claim 19, wherein the dummy wire structure comprises a plurality of sections, and the hold-time violation is corrected according to a total length of the sections.

22. The method of claim 19, wherein the dummy wire structure comprises a first section connected to the cell pin in the preservation area and a second section connected to the first section, and the second section extends along a partial profile of the obstacle structure for a predetermined length.

23. The apparatus method of claim 22, wherein the predetermined length is determined according to the hold-time violation.

24. The method of claim 19, wherein the dummy wire structure comprises a plurality of terminals, only one of the terminals is connected to the cell pin in the preservation area, and the other terminals are physically separated from the other cells.

25. The method of claim 19, wherein the cell pin in the preservation area is connected to another cell through a via structure.

26. The method of claim 19, wherein the hold-time violation is corrected according to a resistance of the dummy wire structure.

27. The method of claim 19, further comprising means for generating a lookup table according to developed delay times corresponding to the different types of dummy wire structure, and the dummy wire structure is selected according to the lookup table.

* * * * *